US005153579A

United States Patent [19]

Fisch et al.

[11] Patent Number: 5,153,579

[45] Date of Patent: Oct. 6, 1992

[54] METHOD OF FAST-FORWARDING AND REVERSING THROUGH DIGITALLY STORED VOICE MESSAGES

[75] Inventors: Kenneth D. Fisch, Delray Beach; James G. Mittel, Boynton Beach; Winfield J. Brown, Jr., Lantana, all of Fla.

[73] Assignee: Motorola, Inc., Schaumburg, Ill.

[21] Appl. No.: 657,936

[22] Filed: Feb. 21, 1991

Related U.S. Application Data

[63] Continuation of Ser. No. 388,463, Aug. 2, 1989, abandoned.

[51] Int. Cl.[5] .................. H04Q 7/00

[52] U.S. Cl. .................. 340/825.22; 340/825.44; 379/67; 379/88

[58] Field of Search .................. 340/825.22, 825.44, 340/311.1; 379/67, 88; 341/110, 123, 126, 144, 151, 152; 381/30, 31, 37; 360/32

[56] References Cited

U.S. PATENT DOCUMENTS

| | | | |
|---|---|---|---|
| 3,716,848 | 2/1973 | Schonholtz et al. | 340/825.44 |
| 4,356,519 | 10/1982 | Cogdell, Jr. | 340/825.44 |
| 4,769,642 | 6/1988 | Davis et al. | 379/88 |
| 4,821,021 | 11/1989 | Ide et al. | 340/825.44 |
| 4,873,520 | 10/1989 | Fisch et al. | 340/825.44 |
| 4,891,835 | 1/1990 | Leung et al. | 379/88 |
| 4,905,003 | 2/1990 | Helferich | 379/88 |
| 4,952,927 | 8/1990 | DeLuca et al. | 340/825.44 |

*Primary Examiner*—Donald J. Yusko
*Assistant Examiner*—Peter Weissman
*Attorney, Agent, or Firm*—Philip P. Macnak; William E. Koch; Thomas G. Berry

[57] ABSTRACT

A paging receiver is provided which digitizes and stores received analog voice messages. The stored voice message may be retrieved by using a first switch for a normal playback mode, or by using a second switch for a fast forward and fast reverse playback mode. The fast forward and fast reverse playback modes are achieved by sequentially retrieving every N(th) message bit stored in memory.

5 Claims, 7 Drawing Sheets

METHOD OF FAST-FORWARDING AND REVERSING THROUGH DIGITALLY STORED VOICE MESSAGES

This is a continuation of application Ser. No. 07/388,463, filed Aug. 2, 1989, now abandoned.

BACKGROUND OF THE INVENTION

1. Field of the Invention

This invention relates to communication receivers having voice storage capability, and more particularly to a paging receiver providing user controllable message retrieval.

2. Description of the Prior Art

Communication receivers which provide the capability for digitizing and storing voice messages have become available with the availability of large, low cost semiconductor memories. One such receiver having voice storage capability can store one sixteen second, or two eight second digitized voice messages utilizing a 256 kilobit CMOS dynamic random access memory (DRAM), or one sixty-four second, or four sixteen second digitized voice messages with a one megabit CMOS DRAM. Digitized voice messages which have been stored were recalled from memory by the user by depressing a "play" button, which initiated the playback of the most recently received message. To review any other stored voice messages, the user was required to repeatedly depress the "play" button while the previous message was being replayed. In this manner, each stored voice message was recalled from memory in the reverse order of the sequence in which the messages were received, i.e. the most recently received message was always replayed first followed in order by the other stored voice messages. To review a stored voice message a second time, the entire sequence of stepping through the messages had to be repeated by the user until the desired message was selected. While the operational sequence described had been suitable for reviewing up to four stored voice messages, there is a need to provide better methods for accessing and retrieving stored voice messages as the number of voice messages stored is increased and as the length of the stored voice messages is increased. In addition, in most instances, only a portion of the stored voice message may contain the information which is required by the user to be replayed at a later time.

Consequently, there is a need by the user to rapidly locate both a particular stored voice message and the desired message portion for which replay is required. In this regard, there is a need to be able to insert certain information into the digitized stored voice message which can be used to rapidly locate the desired message portion, without having to review the entire message on replay at a later time.

SUMMARY OF THE INVENTION

It is an object of the present invention to provide a paging receiver providing user controllable stored voice message retrieval.

It is a further object of the present invention to provide a paging receiver providing rapid review of stored voice messages.

It is a further object of the present invention to provide a paging receiver providing random stored voice message retrieval.

It is a further object of the present invention to provide a paging receiver providing retrieval of user selected portions of the stored voice messages.

A paging receiver includes a means for receiving transmitted analog voice messages. A timing means is provided for generating timing signals at a first data bit rate. A conversion means is coupled to the receiving means for converting the received analog voice messages into digital signals at the first data bit rate, and further for converting the digital signals into analog voice signals. The digital signals are representative of a replica of the analog voice message. A message storage means is provided for sequentially storing the digital signals. A controller means is coupled to the conversion means, to the timing means and to the message storage means and controls the storage of the digital signals at the first data bit rate, and further controls the retrieval of the digital signals from the message storage means. A first switch means is coupled to the controller means for enabling the sequential retrieval of the digital signals from the message storage means at the first data bit rate and conversion thereof to analog voice message signals at a first playback rate. A second switch means is coupled to the controller means for further enabling the sequential retrieval of every Nth bit of the digital signals from the message storage means at the first data bit rate, wherein N is not equal to one, and conversion thereof to analog voice message signals at a second playback rate. An annunciating means is coupled to the controller means and to the conversion means for audibly delivering the analog voice message signals as analog voice messages delivered at the first playback rate and at the second playback rate.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which, and wherein:

DESCRIPTION OF THE PREFERRED EMBODIMENTS

In order to best illustrate the utility of the present invention, it is described in conjunction with a communication receiver, such as a paging receiver, capable of receiving, decoding and storing transmitted analog information such as voice messages. While the present invention is described hereinafter with particular reference to a paging receiver, it is to be understood at the outset of the description which follows it is contemplated that the apparatus and methods, in accordance with the present invention, may be used with numerous other communication receiving systems.

Figure 1:
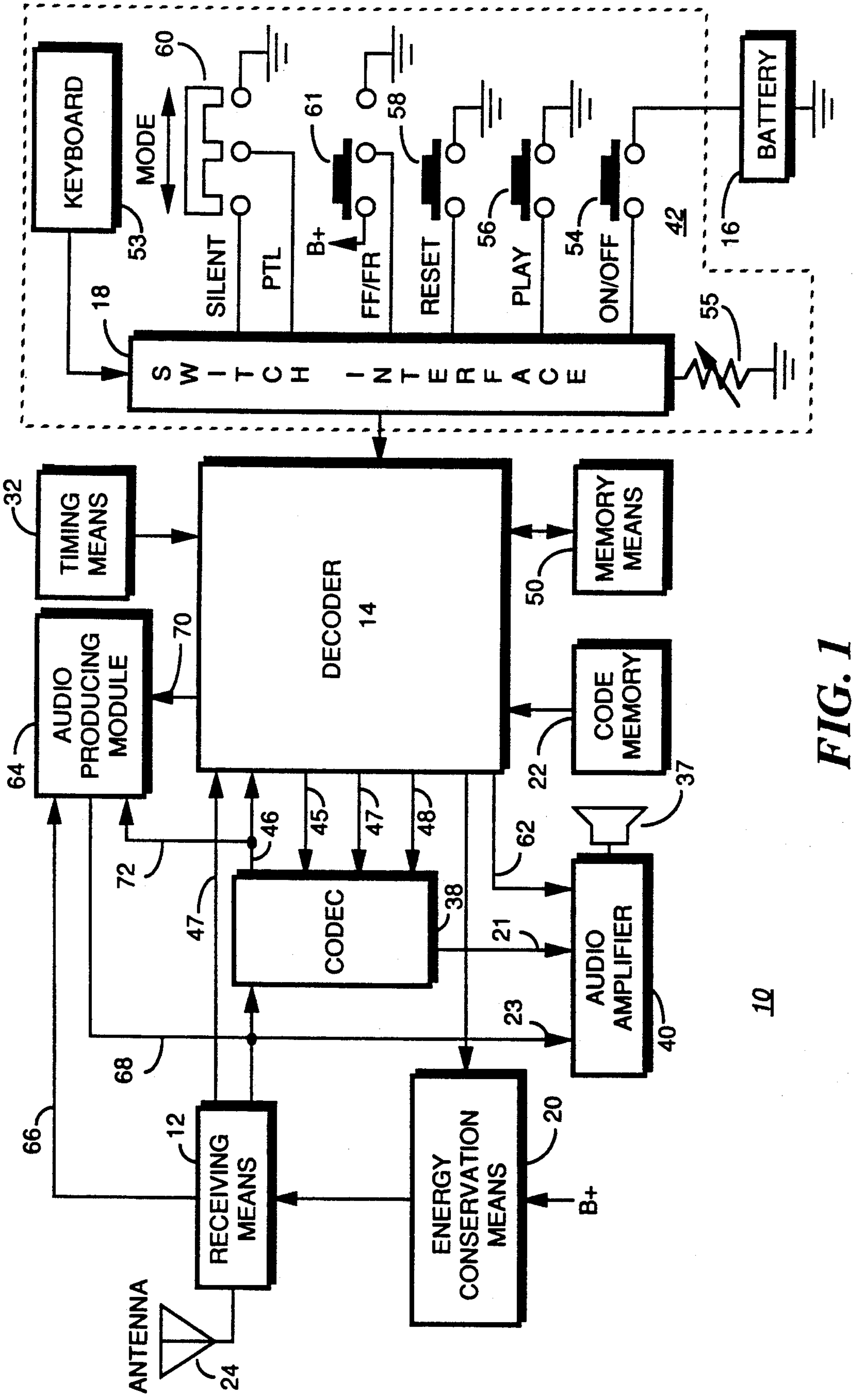
FIG. 1 is an functional block diagram for a hardware embodiment of a digitized stored voice receiver providing user controllable message retrieval.

FIG. 1 shows a functional block diagram applicable to a first embodiment of the present invention. The paging receiver 10 of the present invention includes a receiving means 12, a decoding-controlling means (decoder) 14, a memory means 50, an audio amplifier, an input switch module 42, an energy conservation means 20, a converting means 38, and an audio producing module 64. An antenna 24 receives paging information in the form of selective call signals and analog information comprised of speech signals representative of a voice message. The antenna 24 is coupled to receiving means 12 that is subject to the control of decoder 14. The decoder 14 not only controls receiving means 12, but may also operate receiving means 12 on an intermittent basis to extend the life of battery 16 through energy conservation means 20. The receiving means 12 detects the presence of electromagnetic energy representing the paging information and applies the information to the converting means such as coder-decoder 38. Operating under control from decoder 14 (line 45), the coder-decoder 38 converts the received analog signals, such as a real time audio speech signals, to a stream of binary bits and reconverts the stored binary bits to a replica of the original received analog signals, such as synthesized audio speech signals.

In the illustrated embodiment, the coder-decoder 38 (hereinafter referred to as CODEC) provides for the digitial-to-analog and analog-to-digital conversion of speech signals. The CODEC 38, such as an adaptive delta modulator, converts or encodes an audio input signal (line 44) to a digital data stream (line 46) for storage, and reconverts or decodes a digital data stream (line 48) to reconstruct an audio signal (line 21). In particular, the CODEC 38 monitors the real time audio signal on line 44 and compares it to a past value that it has reconstructed and generates a digital bit (sign) that indicates whether the reconstructed signal's voltage level is higher or lower than the present input value. The CODEC 38 then tries to adapt the reconstructed signal voltage to mirror the present value at the audio input by varying or modulating a current. The current charges or discharges a capacitor (not shown) which changes the reconstructed signal's voltage. The digital output on line 46 is the sign bit which indicates whether the reconstructed signal is behind the input or lower in voltage (logic "0") or ahead of the input or higher in voltage (logic "1"). Under control of decoder 14, the CODEC's digital output is stored in memory 50 and retrieved on line 48 to reconstruct a synthesized audio signal on line 21, thus closely replicating the real time audio signal in both amplitude and frequency. One example of such a coder-decoder is disclosed by N. S. Jayant in the publication "Adaptive Delta Modulation with a One-Bit Memory", Bell System Technical Journal, Vol. 49, No. 2 Mar. 1970. The CODEC 38 is designed to operate at different sampling rates (bit or clock rates) supplied by timing means 32. The sampling rates include, but are not limited to, 16 KHz, 25 KHz, and 32 KHz in the present invention. The obvious implication of these rates is that for slower clock rates, longer messages can be stored in a fixed amount of memory at the expense of a lower signal to noise (S/N) ratio. For example, with a 100 mV P-P reference signal at the input, the signal to noise degradation is 11 dB at 33 KHz, 14 dB at 25 KHz, and 23 dB at 16 Khz.

Table 1 illustrates the number of messages that can be stored in the paging receiver using particular configurations of the memory when the CODEC is operating at a specific bit rate. Even through the table lists specific memories, it is to be understood that numerous other memories can be used in the practice of the present invention. Continuing with the above described table, referring to the 1 megabit CMOS DRAM, if the paging receiver is configured for two messages and the CODEC is operating at 25 kilobits per second (KBPS), Table 1 illustrates that 20 seconds of voice information can be stored in one message slot. As is evident from Table 1, the CODEC operates in a plurality of operating rates such as 16 KBPS per second, 25 KBPS per second, and 32 KBPS per second. The operating rates can be selected by any of a number of methods, such as jumper connections within the paging receiver, by switches external to the paging receiver, or by code plug programmable options.

As can be appreciated, various allocated fixed storage areascan be selected by the pager user. For example, using the 1 megabit. CMOS DRAM, 4 messages can be stored in memory, each message having a fixed length of 16 seconds at 16 KBPS.

Continuing with reference to FIG. 1, to conserve power, most of the CODEC 38 is turned off when there are no read/write operations to the memory. The output buffers and control logic are always on since it may be necessary to monitor the channel or provide an alert tone when there are no messages stored. Keeping the buffers and control logic on also eliminates the need for additional current source controls to handle the switching of an additional current source.

TABLE 1

Message length as a Function of Bit Rate and Memory Size

| Number of Messages | 16 KBPS | 25 KBPS | 32 KBPS |
|---|---|---|---|
| | One 256K CMOS DRAM | | |
| 1 | 16 second | 10 second | 8 second |
| 2 | 8 second | 5 second | 4 second |
| | Two 256K CMOS DRAMs | | |
| 1 | 32 second | 20 second | 16 second |
| 2 | 16 second | 10 second | 8 second |
| 4 | 8 second | 5 second | 4 second |
| | One 1 Meg CMOS DRAM | | |
| 1 | 64 second | 40 second | 32 second |
| 2 | 32 second | 20 second | 16 second |
| 4 | 16 second | 10 second | 8 second |

The receiving means 12 is further coupled by line 23 to an audio amplifier 40. Operating in response to decoder 14, the real time audio signal on line 23 is applied to audio amplifier 40 which supplies the analog signals to speaker 37. In particular, decoder 14 controls audio amplifier 40 via line 62 to apply either the real time audio signal on line 23 or the synthesized audio signal on line 21 to speaker 37.

Decoder 14 is coupled to memory means 50 which serves to include information for decoding the received information and for storing information received from CODEC 38. The CODEC 38 provides the analog-to-digital conversion of speech signals on line 46 which are stored in memory 50 as digital voice messages. In this embodiment, each digital voice message is stored in an allocated fixed length (storage capacity) storage area, depending upon the conversion rate of the CODEC 38 (see Table 1). A plurality of digital voice messages can be stored in memory 50. The decoder 14 functions to alert the paging user, and to store, recall, and playback voice messages.

The paging receiver of FIG. 1 has a capacity of storing voice messages and providing them to audio amplifier 40 according to the state of a plurality of inputs, such as the state of the control switches of input module 42. A switch interface 18 provides input capability for control switches 54–61 and keyboard 53. Illustratively, control switch 54 is an on/off switch for controlling power from battery 16. Control switch 56 is a play switch for playing back voice at a normal rate messages previously digitized and stored in memory 50. Control switch 58 is a reset switch to reset the paging receiver system and to monitor any real time audio signals currently being received. Control switch 60 is a mode switch for operating the decoder in one of three modes. These modes are the silent, push to listen (PTL), and normal modes, the operation of which is not necessary for the understanding of the present invention. Control switch 61 is a fast forward/fast reverse selection switch providing a means to rapidly review a complete stored voice message, or just sections of the stored voice message. Both fast forward and fast reverse reviewing of the messages is provided as later described in FIGS. 3 and 4. Keyboard 53 is a multiple switch input device which allows such user controlled message retrieval functions as random message access, partial message skip and message marking. Random message access allows the user to select a specific stored voice message, such as message number one or number two for review, as described in FIG. 5A, without having to sequence through all messages stored in the memory as in prior art receivers. Partial message skip, also described in FIG. 5A, allows the user to select an offset, such as a time offset, thereby allowing message retrieval at a point such as two seconds into each message. This is especially useful when long message, such as thirty-two or sixty-four seconds are stored, and the information of interest is in the last half of the message. Message marking, as shown in FIG. 5B, allows the user to enter a marker, or signature at the beginning and at end of a portion or segment of the stored messages, allowing important information, such as the calling party's name and phone number to be marked. Only the marked message portion is subsequently replayed, significantly speeding up message retrievals.

Considering FIG. 1 in somewhat further detail, the battery 16 shown connected to decode 14 through switch interface 18. Battery 16 provides power to decoder 14 through an energy conservation means 20, such as a DC to DC converter. Decoder 14 is additionally connected to a code memory 22 which stores predetermined address information to which the paging receiver is responsive. Code memory 50 can also store such information as the sampling rate for digitizing the received audio messages. Output 62 from decoder 14 controls whether real time audio signals on line 23 from receiving means 12 or synthesized audio signals on line 21 from CODEC 38 are applied to audio speaker 37. Communication between receiving means 12 and decoder 14 is achieved via line 47. Selective call signals for the decoder 14 are received by receiving means 12 and passed to decoder 14 through line 47.

An audio producing module 64 is responsive to receiving means 12 and decoder 14. An activation signal generated by receiving means 12 is fed to the audio producing module 64 via line 66. The activation signal, such as a carrier squelch signal, activates the audio producing module to generate a predetermined analog signal on line 68, which is coupled to the input of the CODEC 38 and line 23. The predetermined analog signal is terminated in response to a reset signal generated by decoder 14 and applied as input to the audio producing module 64 as shown by line 70. The reset signal is generated when the remaining capacity of the storage area is filled. For example, in the case where the activation signal is the carrier squelch signal, the predetermined analog signal is generated upon the termination of the analog voice message. If the analog voice message terminates before filing the capacity of the allocated storage area, an aesthetically pleasing signal is produced by the audio producer module 64 and stored in the remaining capacity of the storage area. This aesthetically pleasing signal may take the form of a plurality of tones varying in frequency and time such as a music melody, a single tone, or just silence. This prevents unwanted information or noise from being stored for the remaining capacity of the allocated storage area.

It is important to also note that decoder 14 may also include a predetermined digital representation of the analog signal which can be stored in memory 50. Instead of the audio producing module 64 providing the analog signal to the CODEC, the decoder 14 provides the predetermined digital pattern, such as an idle or quiet pattern, to the allocated storage area upon sensing a control signal from the receiving means 12 via line 47. Thus, the audio producing module 64 can be eliminated, however, at the expense of the real time audio producing module output.

The operation of the paging receiver shown in FIG. 1 is such that the receiving means 12 is capable of receiving messages in any of several message formats through antenna 24. The decoder 14 responds to the received signals to analyze the data and select one of several decoding schemes for appropriately decoding the incoming information received by receiving means 12. As is well known with paging devices, the resulting decoded signal is tested for comparison with a designated pager address contained in code memory 22. On detecting correspondence between the received and decoded signal and the address in code memory 22, the decoder 14 instructs the CODEC 38 to digitize the real time analog voice signals that follows for storage in one of a plurality of message locations or storage areas in memory 50. An alert output signal may be produced by the decoder 14 to generate an alert indicating to the pager user that a message has been received and stored. In particular, the alert output signal from the decoder 14 is supplied to audio amplifier 40 to produce an audible signal from speaker indicative of the receipt of the message.

If the user responds to the message alert, the user has the ability to hear the message in real time, depending upon the position of mode switch 60. Specifically, if the mode switch is on the normal mode, upon receipt of a voice message, the user hears an alert followed by the voice message. Simultaneously, the message is stored into an allocated storage area, depending upon the bit rate of the CODEC 38.

Continuing the discussion of the operation of the paging receiver of FIG. 1, because of the requirements for high speed, real time signal processing and the requirement of preserving extended useful life of the battery contained in paging device, energy conservation means 20 functions in cooperation with decoder 14 to conserve battery 16. It may also be appreciated that the decoder 14 may be designated to operate in one of a plurality of possible decoding schemes. This selective function may be supplied by the code memory 22 or may be factory preset independently of the code memory 22. It may also be appreciated that code memory 22 may contain several addresses, each one corresponding to the appropriately selected decoding scheme which is determined by the decoder 14 in response to signals received by receiver 12.

Figure 2:
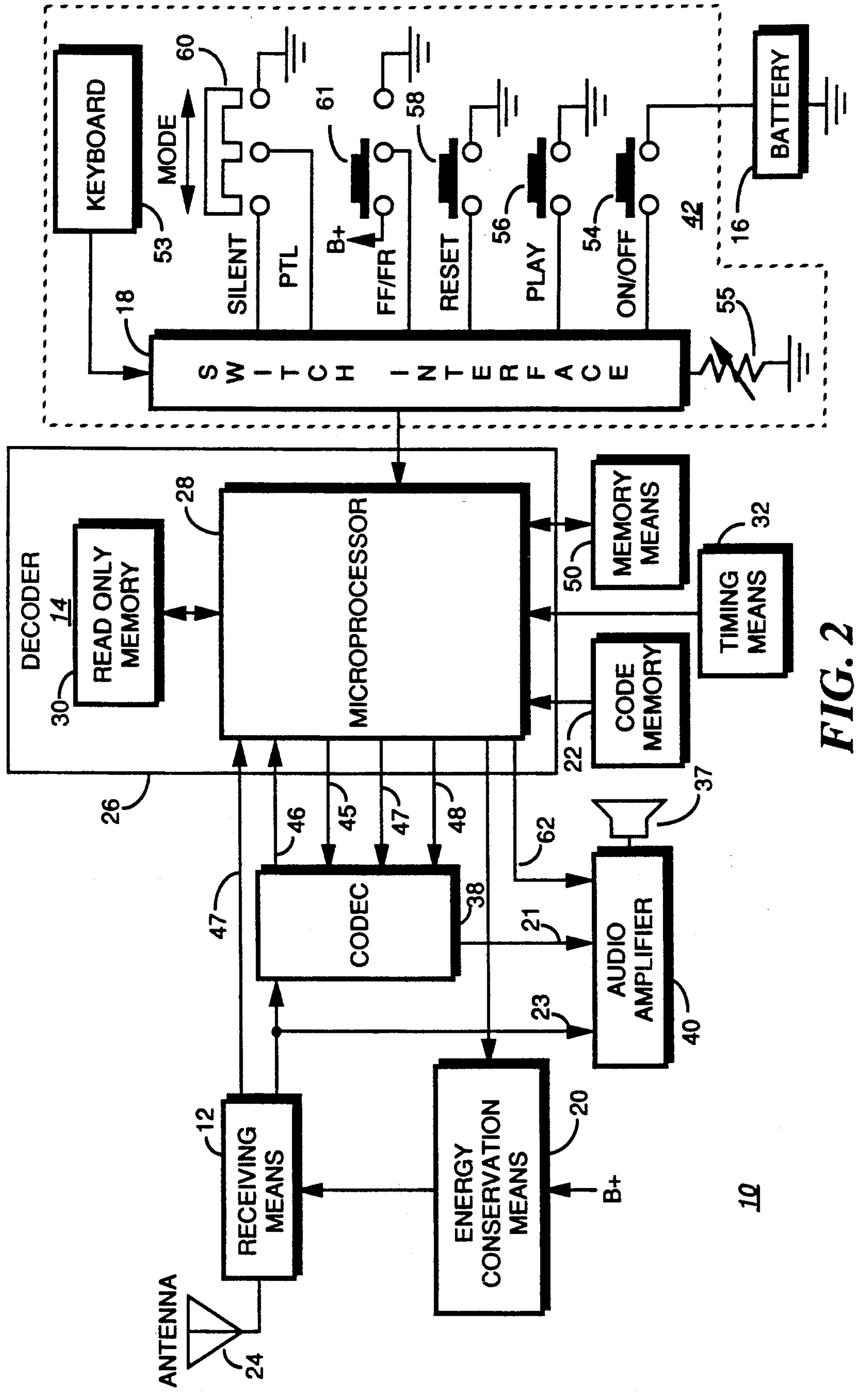
FIG. 2 is an electrical block diagram for a second embodiment of a digital stored voice receiver having a microcomputer decoder.

Turning now to FIG. 2, a second embodiment of the present invention illustrates a microcomputer 26 functioning as the decoder 14. Microcomputer 26 is shown to be further comprised of a microprocessor 28 and a read only memory (ROM) 30. ROM 30 includes the necessary instructions to operate microprocessor 28 to perform the functions as described below. It is understood that microcomputer 26 has the necessary timing circuitry to operate in a manner well known in the art and has similar connections as does the hardware decoder. The replacement of the hardware decoder functions, and the resulting system functions are indistinguishable except to the paging user except as noted below.

The microcomputer 26 uses microprocessor 28 as a software decoder for processing the received signals in real time according to predetermined software routines. After the paging receiver is selectively identified, microprocessor 28 accesses ROM 30 for determining the correct instructions contained in that memory for processing the received signals, converting the analog voice signals to digital form, storing the digital form of the voice signal, and replaying the stored voice signals.

Referring to FIGS. 3, 4, 5A and 5B, there are shown flow charts explaining the programs or routines as stored in read only memory (ROM) 30 to operate the microprocessor implementation of the paging receiver. It is understood that other routines to operate the paging receiver in the particular paging scheme are also present in ROM 30 but are not discussed here since they are not needed for the purposed of explaining the present invention. In this embodiment, the microprocessor decoder also stores the digitized voice messages in variable length storage areas, depending upon the length of the received voice message as will be described later, thus eliminating the need for the audio producing module 64.

Figure 3:
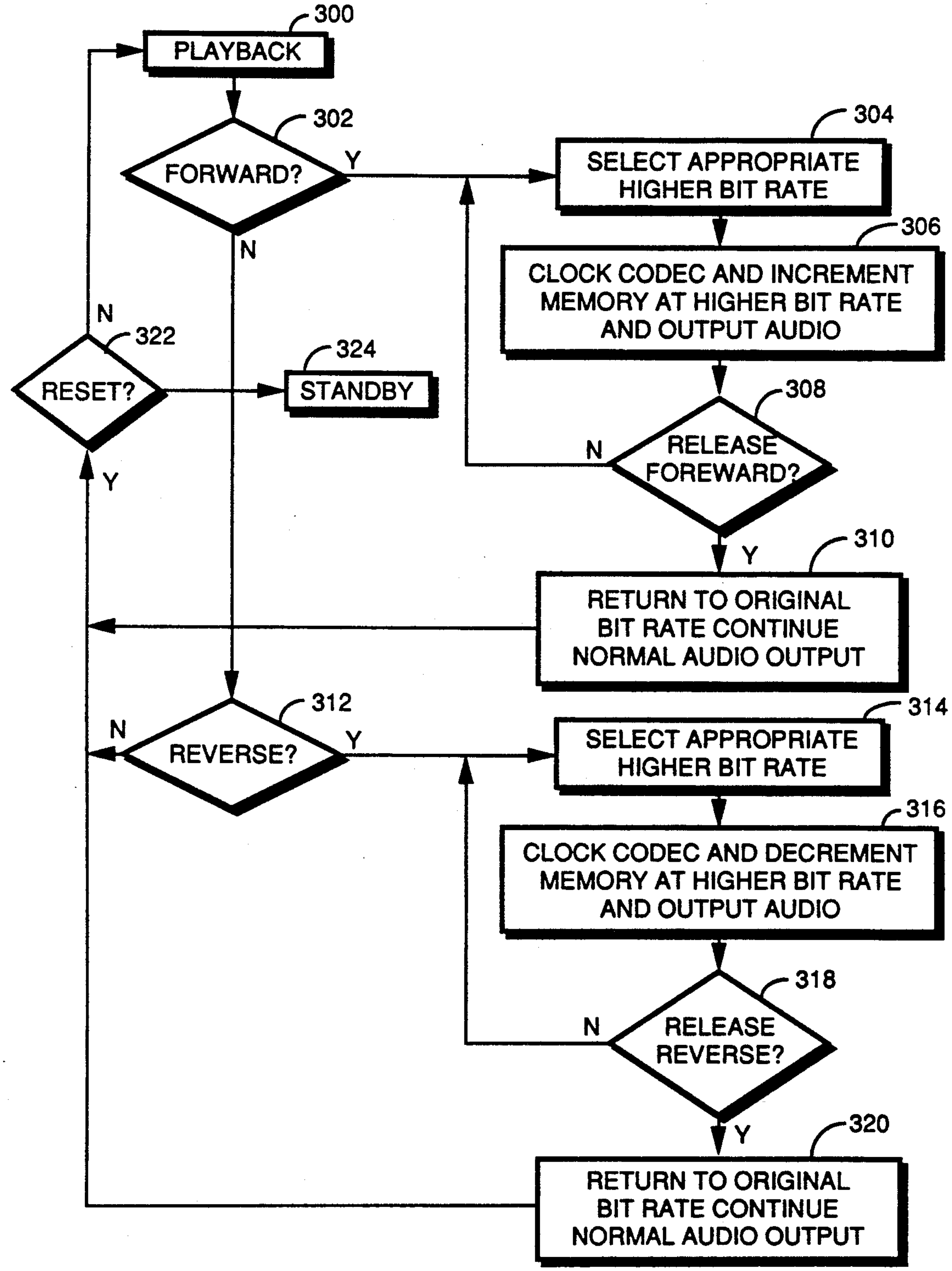
FIG. 3 is a flow chart illustrating a method for fast forwarding and fast reversing stored voice messages utilizing bit rate modification.

FIG. 3 is a flow chart illustrating the method for fast forwarding and fast reversing stored voice messages utilizing data bit rate modification. A stored message may be played back at a normal rate by user actuation of the playback switch, at block 300, or initiated by user actuation of the fast forward switch, at block 302, or the fast reverse switch, at step 312. When the fast forward mode is selected, at block 302, the controller selects an appropriate higher data bit rate for playback, at block 304. In the preferred embodiment of the present invention, the CODEC and memory are clocked at twice the normal data bit rate, at block 306. Thus, voice messages originally digitized at sixteen kilobits per second, are sequentially retrieved from memory, and converted by the CODEC to the audio message at thirty-two kilobits per second, which results in an analog voice message having an elevated pitch. It will be appreciated that other data bit rates can also be utilized, limited only by the extent of the intelligibility to be maintained during the fast forwarding operation. The controller continues to monitor the fast forward/fast reverse switch during playback operation. If the switch is not released, at block 308, playback is continued. If the switch is released, at block 308, the playback continues, but at the normal data rate, at block 310, to allow the user to listen to that portion of the message remaining after the fast forwarding operation is terminated. When the end of the message playback is reached, the paging receiver returns to the standby mode, at block 324. Playback continues to the end of the message, unless the reset switch is actuated, at block 322, at which time playback is terminated, and the receiver returns to the standby mode, at block 324.

When the fast reverse mode is selected, at block 312, the controller selects the appropriate higher data bit rate, at block 314, which as previously described is twice the normal data bit rate for playback. CODEC and memory are clocked at twice the normal data bit rate, at block 316. As previously described, voice messages digitized at sixteen kilobits per second, are sequentially retrieved from memory in the reverse order from which they were digitized, and converted by the CODEC to the audio message at thirty-two kilobits per second, which results in an analog voice message having an elevated pitch and which is spoken backwards. The controller continues to monitor the fast forward/fast reverse switch during playback operation. If the switch is not released, at block 318, playback is continued. If the switch is released, at block 318, the playback continues, but at the normal data bit rate in the forward playback direction, at block 320, to allow the user to listen to that portion of the message remaining after the fast reversing operation was terminated. When the end of the message playback is reached, the paging receiver returns to the standby mode, at block 324. Playback continues to the end of the message, unless the reset switch is actuated, at block 322, at which time playback is terminated, and the receiver returns to the standby mode, at block 324. It will be appreciated that since the data retrieved in the normal forward direction when the fast reverse switch is released mirrors the data retrieved in the fast reverse direction, the CODEC can go into saturation, resulting in a momentary pop sound being generated. In this instance normal audio output is restored when an idle pattern (a pause in speaking) is detected, resetting the CODEC for recovery of the message to follow.

Figure 4:
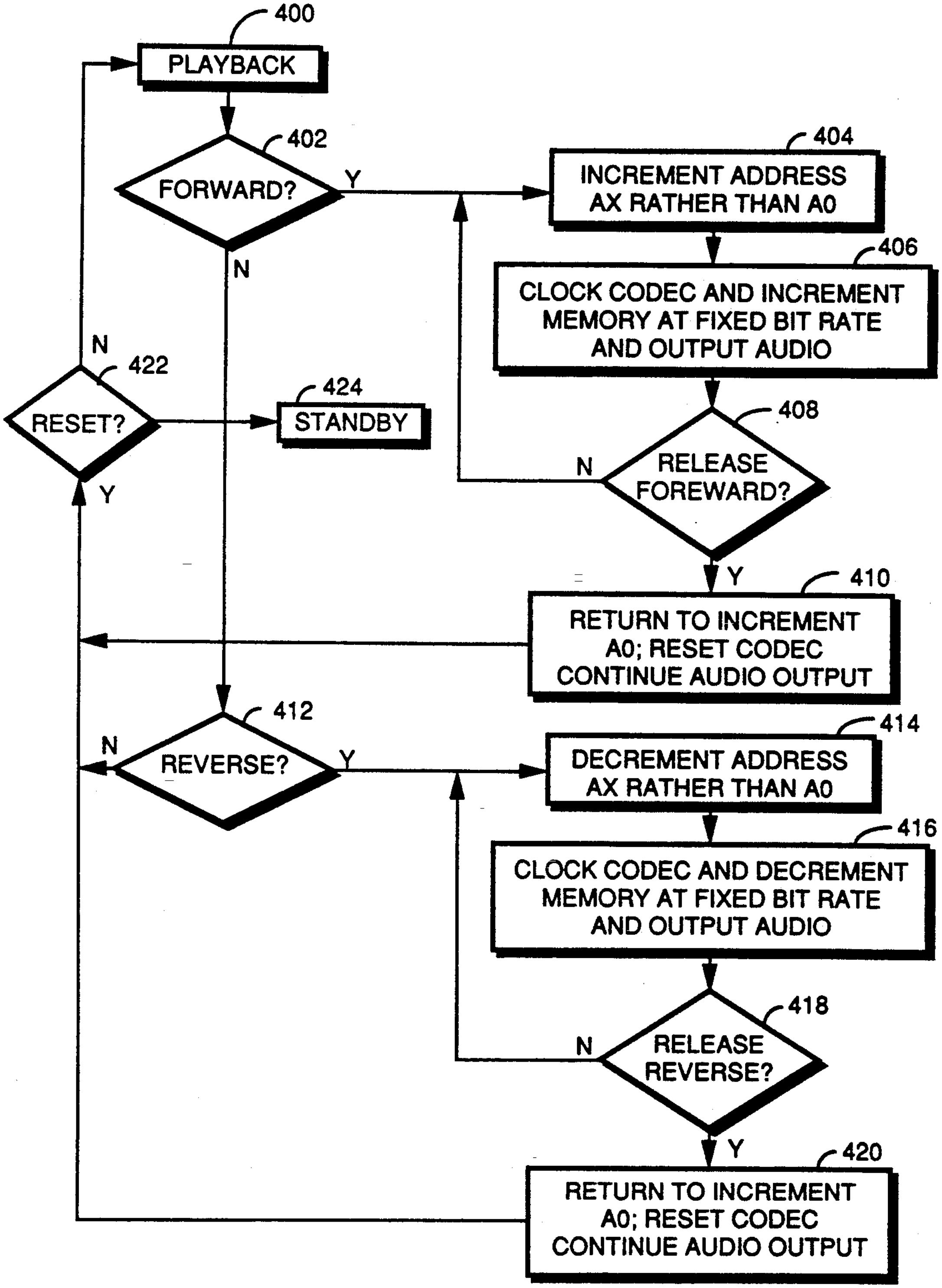
FIG. 4 is a flow chart illustrating a method for fast forwarding and fast reversing stored voice messages utilizing memory address modification.

FIG. 4 is a flow chart illustrating a method for fast forwarding and fast reversing stored voice messages utilizing memory address modification. The advantage of this method of fast forwarding and fast reversing is that the data bit rate remains constant, eliminating the need for the timing means to generate additional data bit rates, as described in FIG. 3. In place of varying the data bit rate at which the digitized voice messages are retrieved from memory, the memory addressing is modified to address every $2^N$th bit, such as every second bit, or every fourth bit of the digitized voice message. By retrieving every second or fourth bit, the voice message is played back at twice or four times the normal rate. The intelligibility of the message is degraded compared to the normal retrieval, and degrades further as fewer bits are recovered from the stored digitized serial data to further increase the playback rate. Depending on the pattern of the retrieved data, there may be instances where the CODEC saturates, which would result in a loss of audio output. When the user deactivates the fast forward/fast reverse switch, the controller forces a reset to the CODEC on line 47, thereby insuring a rapid transistion to the normal playback mode of the voice message. As in the proceeding description, playback can be initiated with the playback switch, at step 400, the fast/forward switch, at step 402, or the fast reverse switch, at step 412, as shown in FIG. 4. When the fast forward mode is selected, at block 402, the controller selects the appropriate steps at which the addresses are incremented to retrieve the message from memory, at block 404. In the preferred embodiment of the present invention, every other bit is read, providing twice the normal playback rate. The CODEC is clocked and the memory is incremented at the same data bit rate, at block 406, as in normal playback. Thus, voice messages digitized at sixteen kilobits per second, are sequentially retrieved from memory, and converted by the CODEC to the audio message at sixteen kilobits per second. The controller continues to monitor the fast forward/fast reverse switch during playback operation. If the switch is not released, at block 408, playback is continued at the higher rate. If the switch is released, at block 408, the playback continues as described above at the normal address incrementing rate, at block 410, to allow the user to listen to that portion of the message remaining after the fast forwarding operation is terminated. Playback continues to the end of the message, unless the reset switch is actuated, at block 422, at which time playback is terminated, and the receiver returns to the standby mode, at block 424. When the end of the message playback is reached, the paging receiver returns to the standby operating mode, at block 424.

When the fast reverse mode is selected, at block 412, the controller selects the appropriate steps at which the addresses are decremented to retrieve the message from memory, at block 414. The CODEC is clocked and the memory is decremented at the same data bit rate, at block 416, as in normal playback. Thus, voice messages digitized at sixteen kilobits per second, are sequentially retrieved from memory, and converted by the CODEC to the audio message at sixteen kilobits per second, which results in an analog voice message having an normal pitch being produced, which is spoken backward. The controller continues to monitor the fast forward/fast reverse switch during playback operation. If the switch is not released, at block 418, playback at the higher rate is continued. If the switch is released, at block 418, the playback continues as described above at the normal address incrementing rate, at block 420, to allow the user to listen to that portion of the message remaining after the fast reversing operation is terminated. Playback continues to the end of the message, unless the reset switch is actuated, at block 422, at which time playback is terminated, and the receiver returns to the standby mode, at block 424. When the end of the message playback is reached, the paging receiver returns to the standby mode, at block 424.

Figure 5A:
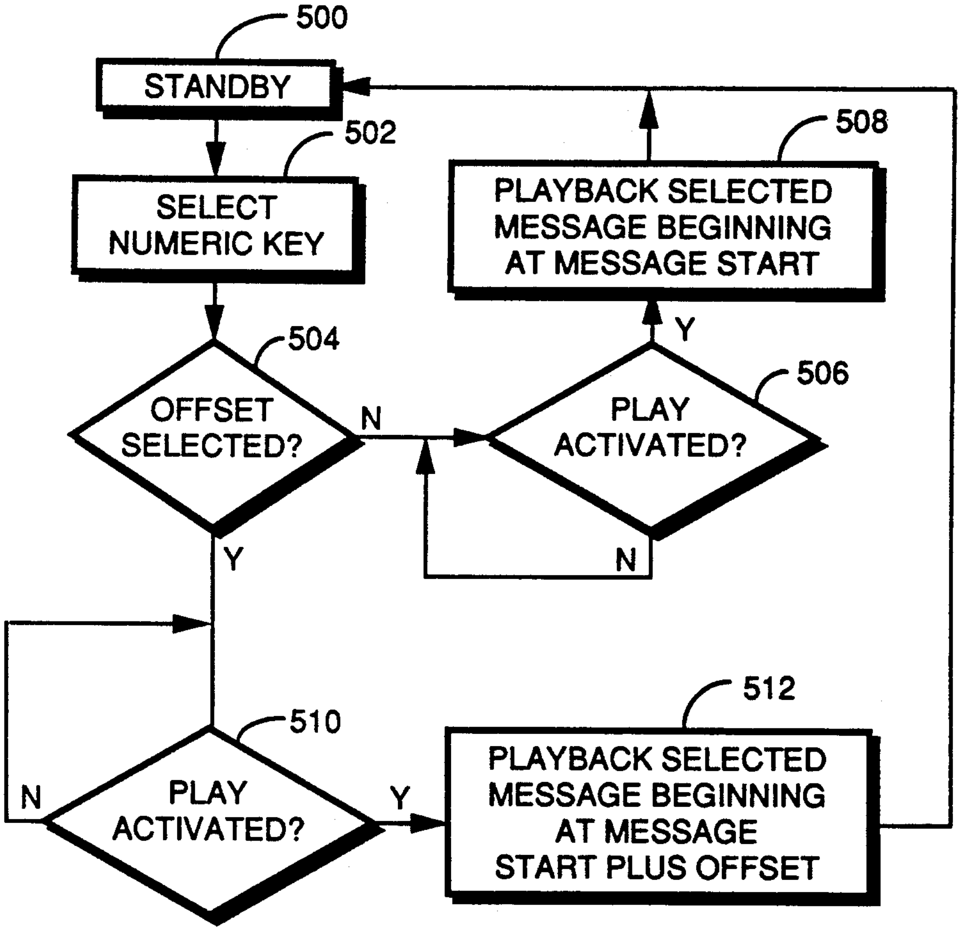
FIGS. 5A and 5B are flow charts illustrating a method for accessing stored voice messages utilizing user selectable memory access methods.
Figure 5B:
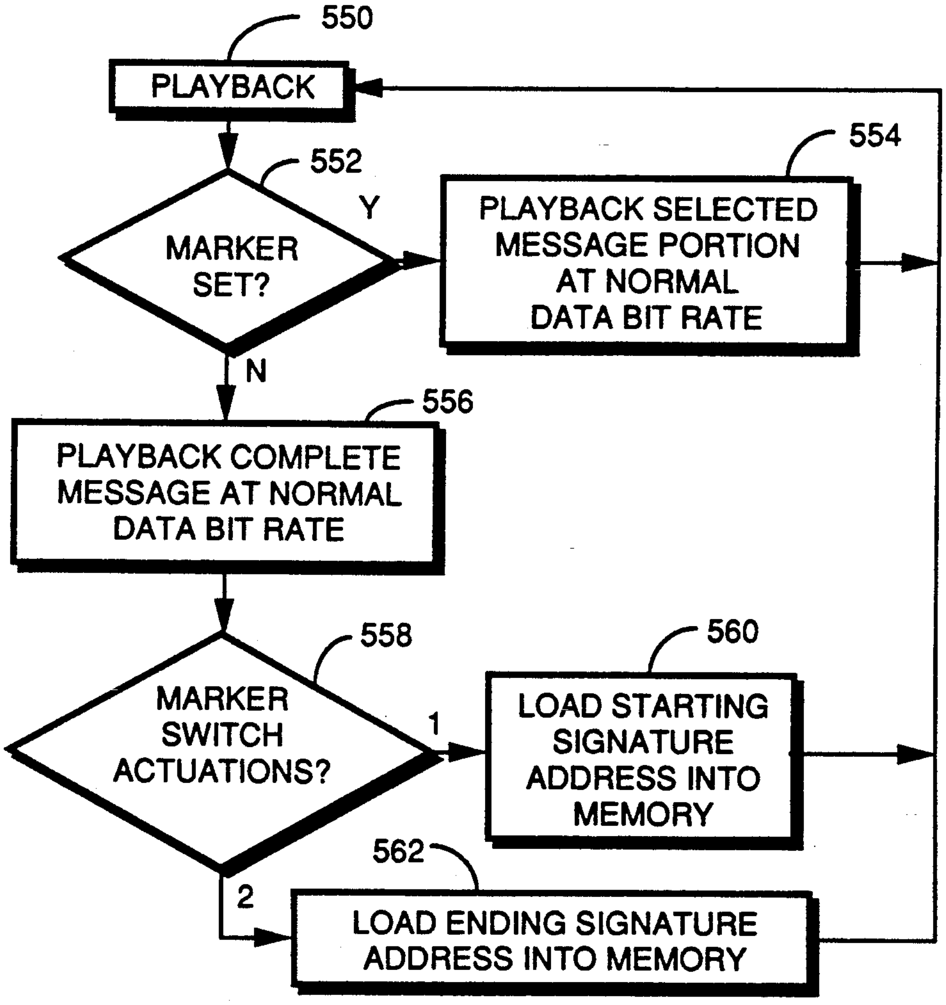

FIGS. 5A and 5B are flow charts illustrating a method for accessing stored voice messages utilizing user selectable memory access methods. Random access stored voice message retrieval is shown in FIG. 5A. Random access message retrieval would occur in much the same manner as described in FIG. 4, except instead of skipping a number of bits in a message to fast forward or reverse the output, the controller jumps to the starting address of the next message. It will be appreciated such operation can be implemented during the normal playback mode, or during the fast forward/fast reverse playback modes. The description to follow with FIG. 5A considers operation from the normal playback mode, although similar operation in the fast forward/fast reverse mode will be apparent to one of ordinary skill in the art.

Random access message retrieval is initiated by the user depressing a number key on the keyboard, corresponding to the message number retrieval is required, at step 502, of FIG. 5A. The controller also checks to determine if any offset has been selected by the user which would result in a jump to an address offset from the start of the message by the amount of offset previously selected, at step 504. For ease of specifying the offset by the user, the offset entered is specified in time units, such as seconds, or fractions thereof, to avoid any confusion which may occur at different data sampling rates. If no offset is selected, at step 504, playback of the selected message beginning at the start of the message, at step 508, proceeds when the play switch is activated, at step 506. Playback continues until the message is completed, at which time the controller returns to the standby state, at step 500.

When an offset has been previously entered, at step 504, playback of the selected message beginning at the start of the message plus the offset amount, at step 512, proceeds when the play switch is activated, at step 510. Playback continues until the message is completed, at which time the controller returns to the standby state, at step 500. The use of random access message retrieval, with and without offsets, provides simplified message access, especially when long messages, such as fifteen seconds and longer are stored. While the operation described shows a two step operating sequence, playback could have been initiated by depressing only a single keyboard key, when the number of messages is ten or less (0–9), without the need for actuation of the playback switch.

Another user selectable memory access method which is shown in FIG. 5B, allows the user to retrieve only user selected portions of the stored voice message. This is especially useful when longer voice messages, such as those having thirty or sixty seconds duration and more are being received and stored. In such messages, much of the information stored may not be relevant at a later time. One such example would be where the message provided information of an immediate nature to be responded to, as well as the caller's name and phone number to be called when the assignment provided is completed, or the information requested is obtained. During the course of reviewing the message, it would then be advantageous to be able to mark the information which is to be recalled at a later time, so as to avoid having to review the entire message a second time. In this instance, when a normal playback of the message is requested, at block 550, the controller checks to see if any markers have been set for the current message, at block 552. If it is determined markers were set, at block 552, the message is played back at block 554 in a normal manner, playing back only that portion of the message that was previously selected by the user. After the playback is completed, the receiver would return to the standby mode, at block 548. A description of the message markers is provided in FIG. 6.

When the controller determines that no markers have been set for the particular message for which playback is requested, at block 552, normal playback of the complete message is initiated, at step 556 of FIG. 5B. While playback of the message proceeds, the controller monitors a predetermined switch, such as a dedicated switch not shown in FIG. 1 or 2, or a predetermined key on the keyboard, which allows the user to set a marker, at step 558. If the marker selection switch is not actuated, at block 558, playback of the stored voice message continues, until the switch is actuated, at block 558, or until the end of the message is reached, at which time the receiver returns to the standby mode, at step 548. When the marker selection switch is actuated during the message playback, at step 558, indicating a portion of the message has been determined to be desirable to review at a later time, the controller determines whether this is the first actuation of the marker selection switch, at block 560. If this is the first actuation of the marker selection switch, at step 558, indicating the beginning of the message portion to be replayed at a later time, the controller determines the address of the current memory position, storing this address as a starting signature address in memory, at block 562, and the message is continued to be replayed. If this is the second actuation af the marker selection switch, at step 558, indicating the ending of the message portion to be replayed at a later time, the controller determines the address of the then current memory position, storing this address as an ending signature address in memory, at block 564, and the message is continued to be replayed. It will be appreciated that the preceeding description provided for only a single message segment to be marked for retrieval at a later time, additional memory space may be allocated, as to be described in FIG. 6, to accommodate the identification of additional message segments. While not shown in FIG. 5B, there may be instances when it is desirable to review the entire message after being previously marked. This is accomplished by depressing the reset switch during the playback of the marked message segment, which resets the current message segment markers and allows the complete message to again be reviewed. While the message is being reviewed, the user can again set the markers, as previously described. Setting the markers can also be accomplished in the fast forward/fast reverse mode, although it will be appreciated, such setting is more difficult due to the loss of intelligibility at the higher playbacks speeds and the inherent delay in user activation of the switch.

While individual marking of messages has been described in the paging receiver, message marking as described, can also be accomplished by a message originator on entering a call. When the message originator reaches a point within the message which is to be marked, the message originator would pause, depress one of keypad keys, such as the asterisk, and then continue with the message. The end of the message segment to be marked is marked in a similar manner. In the terminal, the dual tone "touchtone" code is decoded, and a binary code word is inserted into the message at the appropriate location. Since most terminals provide automatic pause elimination, the transmitted message would not include the time required to make the marker selections. When the message is received by the paging receiver, the received analog voice message is monitored by the controller, as the message is digitized and stored. When a transmitted marker code word is decoded, the appropriate starting and finish signature addresses are stored, as previously described in FIG. 5B. When terminal inserted messages markers are provided, the paging receiver operation is modified to playback the entire message the first time, and then after the marked message segment, or segments.

Figure 6:
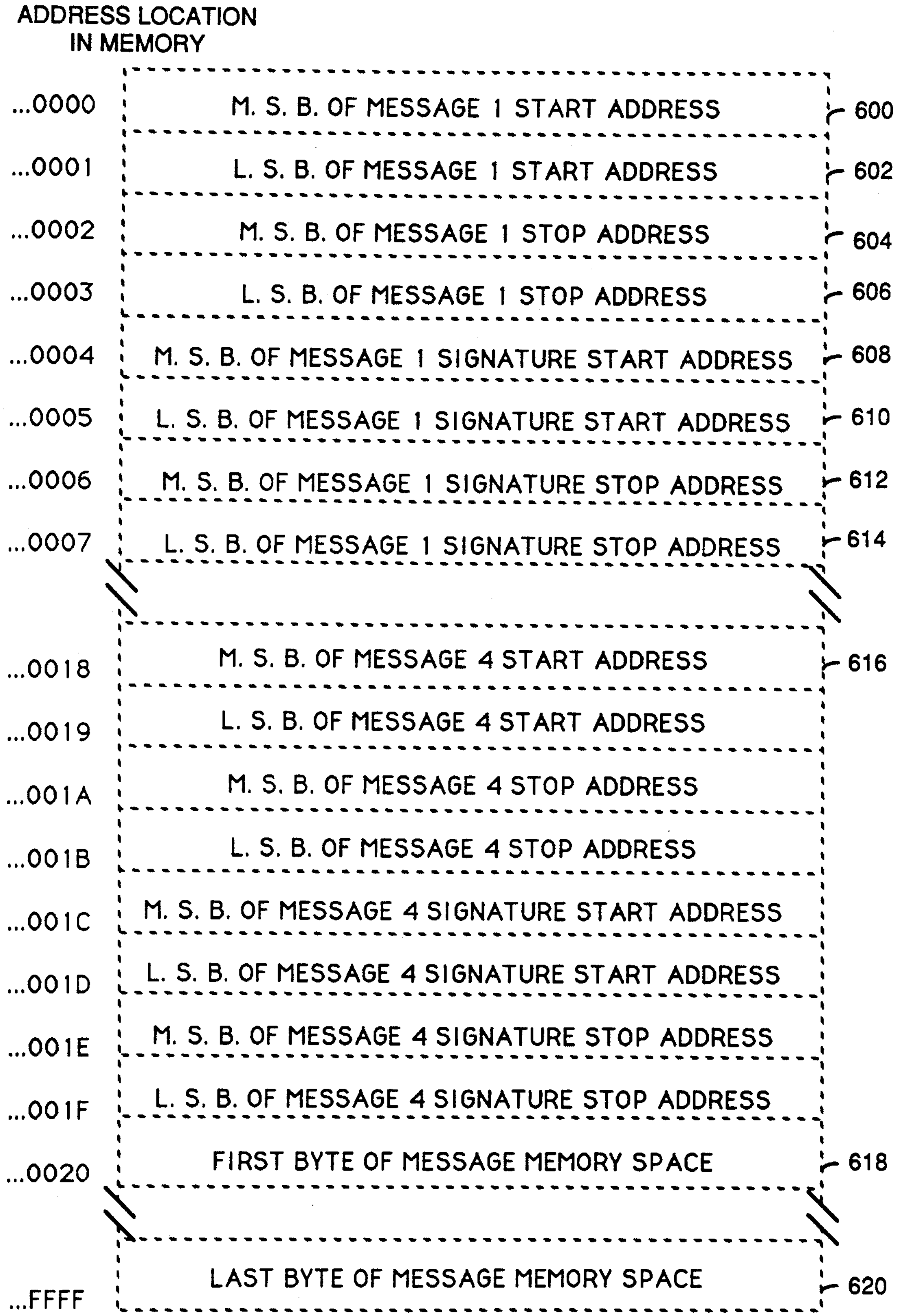
FIG. 6 is a memory map illustrating the memory arrangement for the storage of digitized analog voice messages.

FIG. 6 shows the memory allocation for the preferred embodiment of the present invention. As shown in FIG. 6, each message is identified by a start address of a particular message, defined as two bytes 600 and 602. The stop address is next defined as two bytes 604 and 606. It will be appreciated that in specifying the start and stop addresses of the messages, variable length messages may be readily stored in memory. Following the start and stop addresses are the signature start address, at bytes 608 and 610 and the signature stop address, at bytes 612 and 614 which identify a user selected segment of the stored message for retrieval at later times. While the memory map shown, describes storing four messages, it will be appreciated additional messages can be stored by allocating additional memory area for identifying additional message locations. Following the portion of memory identifying the location of the stored messages, the balance of the memory from bytes 618 through 620 is used for message storage, and variable space as required by the microprocessor. Also included in the memory area from bytes 618–620 is storage for such variables as the address start offset, (not shown) as described in FIG. 5A.

It will be appreciated the memory allocation shown in FIG. 6 is for example only, and that while a memory space of 64K bytes of information is shown, larger memory areas including, but not limited to 256K bytes and 1 megabyte and larger memories may also be provided.

While specific embodiments of this invention have been shown and described, further modification and improvements will occur those skilled in the art. All modifications which retain the basic underlying principles disclosed and claimed herein are within the scope and spirit of the present invention.

We claim:

1. A paging receiver having means for receiving transmitted analog voice messages, said paging receiver comprising:

timing means, for generating timing signals at a first data bit rate;

conversion means, coupled to the receiving means, for converting at the first data bit rate the received analog voice messages into digital signals which are representative of a replica of the analog voice message, and further for converting the digital signals into analog voice signals;

message storage means, for sequentially storing digital signals;

controller means, coupled to said conversion means, to said timing means and to said message storage means, for controlling the storage of the digital signals at the first data bit rate in said message storage means, and further for controlling the retrieval of the digital signals from said message storage means;

first switch means, coupled to said controller means, for enabling the sequential retrieval of the digital signals from said message storage means at the first data bit rate and conversion thereof to analog voice message signals at a first playback rate;

second switch means, coupled to said controller means, for further enabling the sequential retrieval of every Nth bit of the digital signals from said message storage means of the first data bit rate, wherein N is not equal to one, and conversion thereof to analog voice message signals at a second playback rate; and annunciating means, coupled to said controller means and to said conversion means, for audibly delivering the analog voice message signals as analog voice messages delivered at the first playback rate, and at the second playback rate.

2. The paging receiver according to claim 1, wherein said second switch means includes a first position for enabling the sequential retrieval of every nth bit of the digital signals in an ascending sequential order.

3. The paging receiver according to claim 1, wherein said second switch means includes a second position for enabling the sequential retrieval of every Nth bit of the digital signals in a descending sequential order.

4. The paging receiver according to claim 1, wherein said of every Nth bit is enabled only when said second switch means is manually actuated.

5. The paging receiver according to claim 4, wherein the sequential retrieval of each bit of the analog voice message continues when said second switch means is released.

* * * * *

UNITED STATES PATENT AND TRADEMARK OFFICE

CERTIFICATE OF CORRECTION

PATENT NO. : 5,153,579

DATED : October 6, 1992

INVENTOR(S) : Fisch et al.

It is certified that error appears in the above-identified patent and that said Letters Patent is hereby corrected as shown below:

Column 14, line 6, after "said", insert --retrieval--.

Signed and Sealed this

Twenty-sixth Day of October, 1993

Attest:

BRUCE LEHMAN

Attesting Officer

*Commissioner of Patents and Trademarks*